UNITED STATES PATENT OFFICE.

JOHN H. BINGHAM, JULIAN H. GATES, AND JAMES H. ROOT, OF HARTFORD, CONNECTICUT.

IMPROVEMENT IN COMPOUNDS FOR MANUFACTURING PIPES, &c.

Specification forming part of Letters Patent No. 152,964, dated July 14, 1874; application filed March 13, 1874.

*To all whom it may concern:*

Be it known that we, JOHN H. BINGHAM, JAMES H. ROOT, and JULIAN H. GATES, of Hartford, in the county of Hartford and State of Connecticut, have invented a new and useful Composition of Matter, specially applicable to the manufacture of pipe and analogous articles for water, drain, and sewer purposes, of which the following is a specification:

Our invention consists of a compound of metallic slag reduced to a proper degree of fineness in a dry state, and in this dry state mixed with hydraulic cement and water.

For the purpose of indicating, in a general way, the state of the art with reference to the use of slag in building compounds previous to this our present invention, we will say that we are aware of previous American and English patents for reducing or comminuting slag by plunging it, while hot, and as it comes from the furnace, into water; of a previous patent for washing copper slag with water to remove the metal from it; and of a previous patent describing a compound composed of burnt clay, slag, Portland cement, and a solution of muriatic acid and water, all consolidated together under a pressure of from one to two tons to the square inch, the proportion of slag being about one-thirtieth of the whole, and the proportion of the cement about one-twenty-fifth of the whole.

Our slag is taken and crushed or broken up—for small pipes, by preference, to the fineness of coarse sand, though the presence of larger lumps is not a great detriment. For larger sizes of pipe the slag may be left proportionally coarser. The slag is broken, crushed, or comminuted in a dry state, and is kept dry till used, and this dryness is essential, that the slag may retain all its thirstiness or avidity for water till finally mixed with the cement and water to form our compound, so that the slag will, when thus mixed, take up the water used in the mixture with great rapidity, and thus cause the rapid setting and hardening of the compound, which process would be much retarded, and never so perfectly accomplished if the slag were once saturated with water before being used to form the mixture.

For making into pipe, the slag and cement are mixed with water much the same as gravel and cement are mixed for making the common so-called cement pipe, and then tamped or pressed in appropriate molds, no extraordinary pressure being requisite.

The pipe formed of slag and cement is very much stronger, denser, and more durable than the common cement pipe.

The proportions of slag and cement that we have found to work well, and which, so far as our present knowledge extends, we prefer, is two parts, by measure, of slag to one part of cement, though we are satisfied that these exact proportions are not essential, and any proportions of the two which will permanently and durably hang together will embrace the spirit and essence of our invention.

When we say that we use dry slag we do not mean that a drop of water must not be permitted to touch it, for, after the slag is once cooled, the surface is generally found vitrified, which prevents the absorption of water till the slag is broken up; but we mean that our slag is not to be reduced or comminuted by plunging into water while still hot, or that it is not crushed or broken up and then washed or saturated with water previous to mixing with the cement.

For the cement it is possible that some substitute may be used; but we, not being skilled in chemistry, cannot say what such substitutes may be. The essential element of our invention is the use of dry and comminuted or crushed slag in the making of pipe and analogous articles. This, in connection with hydraulic cement or some equivalent therefor, so far as the dry crushed slag is concerned, we lay claim to no equivalent.

We claim as our invention—

A compound of dry crushed slag, cement, and water, as described.

JOHN H. BINGHAM.
JULIAN H. GATES.
JAMES H. ROOT.

Witnesses:
WM. EDGAR SIMONDS.
JOHN POLLITT.